United States Patent

[11] 3,617,310

[72] Inventor George P. Rizzi
              Springfield Township, Hamilton County, Ohio
[21] Appl. No. 836,607
[22] Filed June 25, 1969
[45] Patented Nov. 2, 1971
[73] Assignee The Procter & Gamble Company
              Cincinnati, Ohio

[54] ALKYLTHIAZOLIDINES AS CHOCOLATELIKE FLAVORS
     7 Claims, No Drawings

[52] U.S. Cl. ........................................... 99/140 R
[51] Int. Cl. ........................................... A23l 1/22
[50] Field of Search ............................. 99/140, 23; 260/306.7

[56] References Cited
     OTHER REFERENCES

Tondeur et al., Chemical Abstracts, " Synthesis of 2-alkyl- and 2-arylthiazolidines With or Without Substituent on the Nitrogen Atom Vol. 62, 5264 (b) 1965.

Primary Examiner—Morris O. Wolk
Assistant Examiner—Warren Bovee
Attorney—Edmund J. Sease ABSTRACT: Novel alkylthiazolidines are useful as chocolatelike or cocoalike flavors. Examples of the novel compounds are 2-isopropylthiazolidine and 2-isobutylthiazolidine.

ALKYLTHIAZOLIDINES AS CHOCOLATELIKE FLAVORS

BACKGROUND OF THE INVENTION

This invention relates to a new class of chocolatelike or cocoalike flavors. The compounds of this class can be used per se to supplement, extend and fortify the flavor supplied to cakes, candy, puddings, beverages and the like by chocolate or cocoa. They can also be used as components in artificial flavor mixtures suitable for supplying chocolate or cocoa notes to food products.

SUMMARY OF THE INVENTION

The compounds of this invention which have the above-described utility are novel 2-alkylthiazolidines.

THE PRIOR ART

Thiazolidines are generally known; their chemistry has been reviewed by Sprague and Land in Vol. 5 of Heterocyclic Compounds, R. C. Elderfield, Editor, New York, 1957, pp. 697–722. However, no prior art is known which describes the thiazolidines of this invention. Nor is the fact that any thiazolidines have a chocolatelike flavor known to be described in the prior art. Unilever, British Pat. No. 1,068,712 may show the addition of thiazolidine precursors to foods to provide a creamlike or butterlike flavor.

Other prior art disclosing artificial chocolate flavors but not known to disclose the compounds of the present invention include U.S. Pat. Nos. 2,835,590; 2,835,592–593; and 2,887,384–388.

DETAILED DESCRIPTION OF THE INVENTION

The novel compounds herein have the structural formula

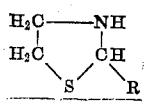

wherein R is a terminally branched alkyl group containing three to six carbon atoms.

These compounds include
2-isopropylthiazolidine
2-isobutylthiazolidine
2-isopentylthiazolidine, and
2-isohexylthiazolidine 2-isopropylthiazolidine has the above structural formula wherein R is a terminally branched alkyl group containing three carbon atoms. 2-isobutylthiazolidine has the above structural formula wherein R is a terminally branched alkyl group containing four carbon atoms. 2-isopentylthiazolidine has the above structural formula wherein R is a terminally branched alkyl group containing five carbon atoms. 2-isohexylthiazolidine has the above structural formula wherein R is a terminally branched alkyl group containing six carbon atoms.

These compounds are conveniently prepared by reacting 2-aminoethanethiol with an appropriate aldehyde according to the following reaction equation wherein R has the definition given above:

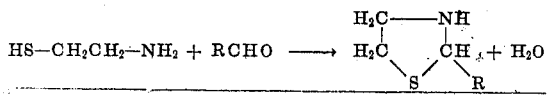

The novel compounds of this invention can be used to supply chocolatelike or cocoalike notes to food products. They can be used for this purpose at levels ranging from 0.5 p.p.m. to 10,000 p.p.m., based on the weight of the food product to which they are added. Preferably, these compounds are utilized at levels ranging from 1 p.p.m. to 2,000 p.p.m., based on the weight of the food product to which they are added.

The novel compounds can be used in pure form or in combination with a carrier. Suitable carriers include water, ethanol, mineral oil, dextrose, starch, or gum arabic. When used in combination with a carrier to provide a flavor composition, the novel compound ordinarily amounts to from 1 percent to 10 percent by weight of the flavor composition.

The novel compounds of this invention can also be used in combination with other flavor components to provide artificial flavor mixtures suitable for supplying chocolate or cocoa notes to food products. These other flavor components include vanillin, ethyl vanillin, linalool, anisic aldehyde, and acetaldehyde. These other flavor components also include particular alkyl pyrazines. Suitable alkyl pyrazines are disclosed in Nakel and Dirks, U.S. Pat. application Ser. No. 677,030 filed Oct. 23, 1967. These other flavor components also include particular aldimines. These aldimines are described in my copending patent application entitled "Aldimines As Chocolate-Like Flavors" which was filed concurrently with the present application.

The following examples further illustrate the novel compounds herein, their preparation, their flavor properties, and their use in a food product to supply significantly enhanced chocolatelike or cocoalike flavor. Examples I and II illustrate the novel compounds herein, their preparation, and their flavor properties. Example III illustrates the use of novel compounds herein to supply an enhanced cocoalike or chocolatelike flavor to devil's food cake.

EXAMPLE I

Preparation of 2-isoproplthiazolidine

A mixture consisting of 2-aminoethanethiol hydrochloride (2.65 grams, 0.0233 mole) and 25 milliliters of water is treated with 2.12 milliliters of isobutyraldehyde. This combination is heated in a nitrogen atmosphere for 2 hours. The mixture is then cooled to 0° C., basified by adding 10 milliliters of 6 normal aqueous NaOH solution and extracted with ether. The ether extract is dried over anhydrous magnesium sulfate, filtered and concentrated to yield 2.57 grams of crude product. Distillation of the crude product gives 2.27 grams of substantially pure 2-isopropylthiazolidine which has a boiling range of 78°–83° C. under 60 12–13 millimeters Hg pressure. Analysis: Calculated for $C_6H_{13}NS$: S=24.4%; Found: S=24.3%. The 2-isopropylthiazolidine when sniffed at a level of 1 p.p.m. in either mineral oil or water gives a chocolatelike aroma sensation.

EXAMPLE II

Preparation of 2-isobutylthiazolidine

A mixture of 2-aminoethanethiol hydrochloride (5.68 grams, 0.050 mole) and 25 milliliters of water is treated with 5.36 milliliters (0.050 mole) of isovaleraldehyde. This combination is heated in a nitrogen atmosphere on a steam bath for 2 hours. The mixture is then cooled to 0° C., basified by adding 10 milliliters of 6 normal aqueous NaOH solution and extracted with ether as described in example I. In this way 6.99 grams of crude product is obtained which upon distillation gives 6.25 grams of substantially pure 2-isobutylthiazolidine. This product has a boiling range of 97°–98° C. under 13 millimeters Hg pressure. Analysis: Calculated for $C_7H_{15}NS$: S=22.05%; Found: S=22.1%. The 2-isobutylthiazolidine when sniffed at a level of 1 p.p.m. in either mineral oil or water gives a chocolatelike aroma sensation.

2-isopentylthiazolidine is formed when an equivalent amount of 4-methylpentanal is substituted for the isovaleraldehyde above. 2-isohexylthiazolidine is formed when an equivalent amount of 5-methylhexanal is substituted for the isovaleraldehyde above. These products when sniffed in mineral oil or water at a 1 p.p.m. by weight level give a chocolatelike aroma sensation.

EXAMPLE III

Use of 2-isopropylthiazolidine to enhance the chocolatelike or cocoalike flavor of devil's food cake A devil's food dry mix is prepared having the following composition:

| Ingredient | Percent by Weight |
| --- | --- |
| Flour (soft wheat cake flour i including 0.5% by weight high-protein wheat flour) | 38.18 |
| Sugar (industrial fine granulated sucrose and dextrose) | 39.30 |
| Shortening[1] | 11.00 |
| Sodium bicarbonate | 2.45 |
| Sodium aluminum phosphate | 0.70 |
| Nonfat milk solids | 1.00 |
| Carboxymethyl cellulose | 0.20 |
| Salt | 1.00 |
| Cocoa | 6.00 |
| Butterlike flavor | balance |

[1] The shortening is prepared by melting together the following and plasticizing by rapidly cooling with agitation (percentages are by weight): 80 % vegetable oil shortening comprising about 80% soybean oil and 20% cottonseed oil, which have been refined, bleached, deodorized and hydrogenated to an iodine value of about 60; 14.0% alpha-phase crystal-tending emulsifiers comprised of 10% propylene glycol monostearate and 4% rapeseed glyceride; 0.25% high temperature batter stabilizer comprised of stearic acid; and 5.75% propylene glycol distearate (an inert byproduct from propylene glycol monostearate preparation).

The mix is prepared by blending together thoroughly the flour, sugar and shortening in a paddle mixer, and then passing the blend through a roller mill. After the milling step, the remaining ingredients are added, and the resulting mixture is processed in an entoleter.

Batter is then made by adding three whole eggs and 1.33 cups of water to 19 ounces of the mix. To this batter is added a solution of 2-isopropylthiazolidine (IPTI) in ethanol (10 percent by weight IPTI and the remainder ethanol) to provide in the batter 200 p.p.m. IPTI based on the weight of the dry mix in the batter. The batter is then mixed in a conventional household electric mixer for 3 minutes at high speed (875 r.p.m.) and for 1 minute at medium speed (450 r.p.m.). A 9-inch cake pan is filled with 492 grams of batter and baked at 350° F. for 32 minutes.

The resulting devil's food cake has significantly more cocoalike flavor than devil's food cake made the same but without the addition of the IPTI.

Similar results of significantly more cocoalike flavor are achieved when cake is made as above except that IPTI ethanol solution is added to provide 500 p.p.m., 600 p.p.m., 1,000 p.p.m. or 1,500 p.p.m. IPTI by weight of the dry mix in the batter instead of 200 p.p.m.

Similar results of significantly more cocoalike or chocolatelike flavor are achieved in devil's food cake when equal amounts of 2-isobutylthiazolidine, 2-isopentylthiazolidine, or 2- isohexylthiazolidine are substituted for the IPTI above.

What is claimed is:

1. A food composition having chocolatelike or cocoalike flavor notes comprising (1) a food product to which a chocolatelike or cocoalike flavor is desired to be imparted and (2) an effective flavor-imparting amount of an alkylthiazolidine having the structural formula

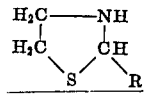

wherein R is a terminally branched alkyl group containing three to six carbon atoms.

2. The food composition of claim 1 wherein the amount of alkylthiazolidine is from 0.5 p.p.m. to 10,000 p.p.m.

3. The food composition of claim 2 wherein the amount of alkylthiazolidine is from 1 p.p.m. to 2,000 p.p.m.

4. The food composition of claim 2 wherein R of the alkylthiazolidine compound is a terminally branched alkyl group containing three carbon atoms.

5. The food composition of claim 2 wherein R of the alkylthiazolidine compound is a terminally branched alkyl group containing four carbon atoms.

6. The food composition of claim 2 wherein R of the alkylthiazolidine compound is a terminally branched alkyl group containing five carbon atoms.

7. The food composition of claim 2 wherein R of the alkylthiazolidine compound is a terminally branched alkyl group containing six carbon atoms.

* * * * *